United States Patent Office 3,759,892
Patented Sept. 18, 1973

3,759,892
AZO DYE WITH A BIS-(2-HYDROXY-3-CARBOXY-PHENYL) METHANE COUPLING COMPONENT
Heinz Wicki, Allschwil, Basel-Land, Switzerland, assignor to Sandoz Ltd., Basel, Switzerland
No Drawing. Filed Feb. 12, 1970, Ser. No. 10,991
Claims priority, application Switzerland, Feb. 19, 1969, 2,496/69; Aug. 22, 1969, 12,772/69
Int. Cl. C09b 29/14, 33/14, 33/18
U.S. Cl. 260—145 C
28 Claims

ABSTRACT OF THE DISCLOSURE

Azo dyes and their metal complex compounds are formed by coupling 1 or 2 moles of a diazo component with a bis-1-(2-hydroxy-3-carboxyphenyl) methane. They are highly suitable for dyeing leather, for which they have very good penetrative properties and yield light-fast dyeings.

---

This invention relates to azo dyes having the formula

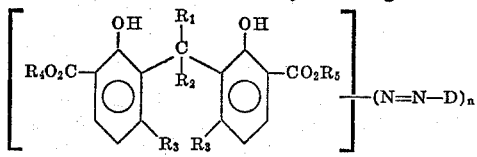

(I)

and which are highly suitable for dyeing leather and metal complexes thereof, wherein $R_1$ is hydrogen, alkyl or substituted alkyl,
$R_2$ is hydrogen, alkyl, substituted alkyl, aryl or substituted aryl,
$R_3$ is hydrogen, sulfo, alkyl or substituted alkyl,
$R_4$ is hydrogen, alkyl, substituted alkyl, aryl or substituted aryl,
D is the radical of a diazo component, such as substituted anilinophenyl, and
$n$ is 1 or 2.

It has been found that dyes of the formula

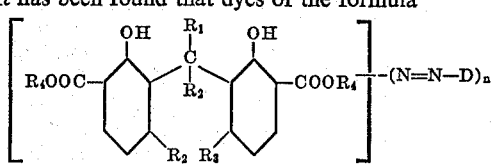

(I)

where
$R_1$ stands for hydrogen or an optionally substituted alkyl radical,
$R_2$ for hydrogen or an optionally substituted alkyl or aryl radical, each of the radicals $R_3$ for hydrogen, the sulphonic acid group or an optionally substituted alkyl radical,
each of the radicals $R_4$ for hydrogen or an optionally substituted alkyl or aryl radical,
D for the radical of a diazo component and
$n$ for 1 or 2, are highly suitable for the dyeing of leather, in the form as obtained and in the form of their metal complex compounds, both alone and in mixture with each other or in mixture with dyes or the metal complexes of dyes of other formulae.

The dyes of Formula I can be produced by coupling $n$ moles of the diazo compound of an amine of the formula $$D\text{---}NH_2 \qquad (II)$$

with 1 mole of a compound of the formula

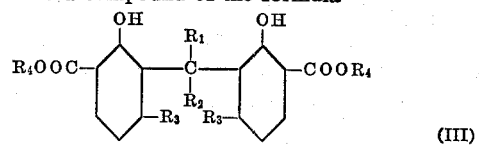

(III)

Dyes which, in metal-free form, have the formula

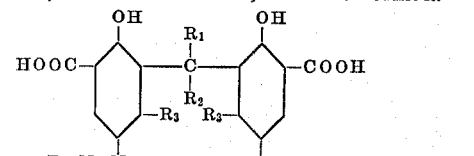

(IV)

are of good quality. The dyes of this formula in which $R_1$, $R_2$ and $R_3$ represent hydrogen (Formula IVa) have particularly good properties.

Dyes of similarly good quality are those of the formula

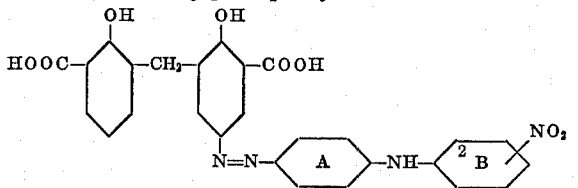

(V)

where the ring A and/or B bears a sulphonic acid group occupying preferably the 2-position of the ring B and the nitro group is in para-position to the NH-bridge.

Other equally good dyes are of the formula

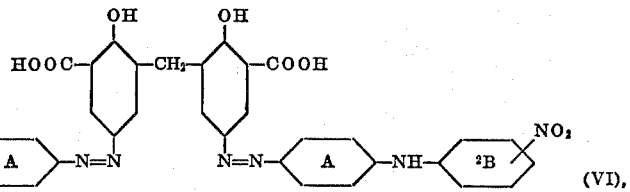

(VI), where A and B have the aforestated meanings. The sulphonic acid group is preferably in the 2-position of the ring B and the nitro group in para-position to the NH-group, or in particular those of the formula

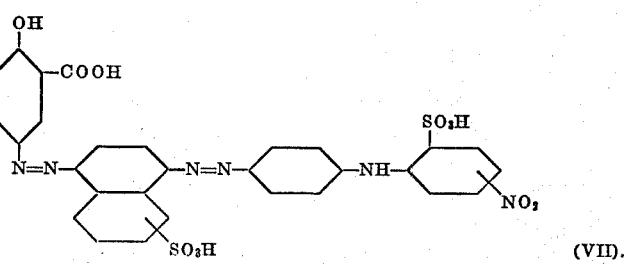

(VII).

The azo dyes formed as given above can be treated either in substance or on the substrate with metal-yielding agents, e.g. chromium, iron, cobalt, copper, manganese or nickel-yielding agents, to give metal-containing compounds. The metal-containing azo dyes of Formula I can also be obtained by coupling the diazo compound of an amine of Formula II with a metal-containing compound of Formula III. The coupling reaction can be carried out by any of the known methods. The metallizing reaction is best conducted in aqueous medium, if required with the addition of an organic solvent, or in an organic solvent medium. It is preferable to form the chromium complexes with 1 or 2 moles of a chromium-donating compound in the presence of 2 to 4 moles of salicylic acid.

An acid medium is preferable, although the metallizing reaction can also be effected in neutral to alkaline medium.

Suitable compounds of copper include cupric sulphate, cupric formate, cupric acetate and cupric chloride; those of nickel, nickel formate, nickel acetate and nickel sulphate; those of chromium, chromic sesquioxide, chromic fluoride, chromic sulphate, chromic formate, chromic acetate, chromic potassium sulphate and chromic ammonium sulphate. The chromates too, e.g. sodium and potassium chromate and bichromate, are well suited for metallization. Examples of suitable manganese, cobalt and iron compounds are manganese, cobalt and iron formate, acetate and sulphate.

It is desirable for the alkyl radicals, e.g. the radicals $R_1$ to $R_4$, to contain 1 to 6 or 1 to 3 carbon atoms. They may be substituted by halogen, such as chlorine, bromine or fluorine, by the hydroxyl or cyano group or by an aryl, e.g. phenyl, group. In such cases the alkyl radical stands for an aralkyl radical.

The optionally substituted aryl radicals are preferably phenyl- or naphthyl radicals, which may be substituted by optionally substituted alkyl or alkoxy radicals; the phenyl or naphthyl radicals may also be substituted by halogen, such as chlorine, bromine or fluorine, or by the cyano, nitro or hydroxyl group, an amino, an alkylsulphonyl, an alkylcarbonyl, an alkylsulphonylamino, an arylsulphonylamino group or by the sulphonic acid or carboxylic acid group.

Examples of radicals of diazotizable amines of Formula II are those of the benzene, naphthalene and heterocyclic series which may bear any desired substituents, e.g. the sulphonic acid group, halogen, such as chlorine, bromine or fluorine, the nitro group, an amino group, acylamino, carboxyl, hydroxyl, optionally substituted alkyl or alkoxy, alkylsulphonyl, arylsulphonyl, sulphonic acid amide, the nitrile group, trifluoroalkyl, or an arylazo group, such as a phenyl or naphthylazo group.

Identical or different compounds of Formula II can be employed in the process of this invention.

The dyes and metal complexes of dyes obtained by the present process are used for dyeing and printing animal and synthetic fibres, but more especially for leather dyeing. They are applicable as mixtures of several dyes or metal-complex dyes. They show excellent level dyeing properties on leathers tanned with various agents with very good penetrative properties, and the dyeings have good fastness to light.

The dyes of Formula I have better acid fastness and better acid stability than the next comparable dyes of Belgian Pat. 707,644 and their dyeings on leather are of brighter shade. Moreover they are obtained free from by-products.

Compounds of Formula III can be produced by reacting 2 moles of a salicylic acid or salicylic acid ester with 1 mole of an aldehyde, for example in the presence of an inorganic or organic acid. Aliphatic or aromatic aldehydes, such as formaldehyde, para-formaldehyde, acetaldehyde, propionaldehyde, benzaldehyde, para-dimethylaminobenzaldehyde, or compounds yielding aldehyde, e.g. acetals, can be used.

In the following examples the parts and percentages are by weight and the temperatures are given in degrees centigrade.

EXAMPLE 1

309 parts of 4-amino-4'-nitro-2'-sulphodiphenylamine are diazotized by the normal method. The diazonium compound is allowed to drop into a receiver containing 288 parts of bis-1-(2-hydroxy-3-carboxyphenyl)-methane in aqueous sodium hydroxide solution. The coupling reaction takes place at a pH-value of 10–13 and at a temperature of 0–22°. The solution is adjusted acid to Congo paper and the dye isolated by the addition of sodium chloride. On drying it is obtained as a yellow-brown powder which dissolves readily in water. On leather it gives level dyeings of yellow-brown shade.

EXAMPLE 2

The dye formed by the procedure of Example 1 is dissolved in aqueous sodium hydroxide solution and 280 parts of salicylic acid are added to the solution at a pH-value of 12. The temperature is increased to 90° and 500 parts of chrome alum are added, after which the solution is stirred at pH 10–11 and 98–100°. Hydrochloric acid and sodium chloride are added to isolate the resulting metallized dye, which is then dried. It dyes leather in level yellow-brown shades of good light fastness.

EXAMPLE 3

618 parts of 4-amino-4'-nitro-2'-sulphodiphenylamine are diazotized in the normal way and coupled at a pH-value of 10–12 with 288 parts of bis-1-(2-hydroxy-3-carboxyphenyl)-methane in aqueous sodium hydroxide solution. A solution of a salicylatochromium complex, containing 30 parts of $Cr_2O_3$ and salicylic acid is added to the solution of the resulting dye and metallization is effected by treatment for 1 hour at a pH-value of 10–11 and 98–100°. The metallized dye is isolated at a pH-value of 5 by the addition of common salt and dried at 100°. On leather it produces level, fast-to-light yellow-brown dyeings.

EXAMPLE 4

199 parts of 1-hydroxy-2-amino-4,6-dinitrobenzene are diazotized in the normal way and the diazonium compound is coupled with 288 parts of bis-1-(2-hydroxy-3-carboxyphenyl)-methane in solution in aqueous sodium hydroxide solution. The compound thus formed is coupled with 173 parts of diazotized 1-amino-3-sulphobenzene at a pH-value of 12. The solution is adjusted to a pH-value of 3, the dye precipitated with sodium chloride and dried. The dye is readily soluble in water and dyes leather in level yellow-brown shades with good all-round fastness. The corresponding chromium complex can be produced by the procedure of Example 2. It also gives dyeings of yellow-brown shade on leather.

EXAMPLE 5

The coupling compound is prepared as in Example 4 by coupling 199 parts of 1-hydroxy-2-amino-4,6-dinitrobenzene with 288 parts of bis-1-(2-hydroxy-3-carboxyphenyl)-methane in the normal way. The compound is coupled in aqueous sodium hydroxide solution with a diazo compound formed by coupling 309 parts of 4-amino-4'-nitro-2'-sulphodiphenylamine with 223 parts of 1-aminonaphthalene-6-sulphonic acid. The solution is adjusted acid to Congo paper and the dye isolated with sodium chloride. This dye is well soluble in water and dyes wool and leather in havana-brown shades of good levelness. The corresponding chromium complex can be produced by the procedure detailed in Example 2; it also gives havana dyeings on leather.

In the following table the structural composition of further dyes is specified, which can be produced in accordance with the procedure of Example 1. In column II the figure under "$n_1$" represents the $n$ number of moles of the first diazo component. In column V "$n_2$" gives the $n$ number of moles of the second diazo component.

| Ex. No. | I, First diazo component | II, $n_1$ | III, Coupling component of Formula III | IV, Second diazo component | V, $n_2$ | Shade of dyeing on leather |
|---|---|---|---|---|---|---|
| 6 | 4-amino-2'-nitro-4'-sulphodiphenylamine | 2 | HOOC–C₆H₃(OH)–CH₂–C₆H₃(OH)–COOH | | | Orange-brown. |
| 7 | 3-amino-4-methyl-2'-nitro-4'-sulphodiphenylamine | 2 | Same as above | | 1 | Yellow-brown. |
| 8 | 3-amino-4-methyl-2'-sulpho-4'-nitrodiphenylamine | 2 | do | | 1 | Yellow. |
| 9 | 4-amino-3-sulpho-4'-nitrodiphenylamine | 2 | do | | 1 | Yellow-brown. |
| 10 | 1-amino-3-sulphobenzene | 1 | do | | 1 | Do. |
| 11 | 4-amino-4'-nitro-2'-sulphodiphenylamine | 1 | do | 4-amino-4'-nitro-2'-sulphodiphenylamine. Monoazo compound formed by coupling diazotized 1-amino-4-nitrobenzene with 1-amino-8-hydroxynaphthalene-3,6-disulphonic acid. | 1 | Do. |
| 12 | H₂N–C₆H₄–SO₃H (1-amino-4-sulphobenzene) | 1 | do | 2-nitro-4-amino-phenol (OH, NO₂, NH₂) | 1 | Do. |
| 13 | Same as above | 1 | do | 2,4-dinitroaniline (NO₂, NO₂, NH₂) | 1 | Brown-yellow. |
| 14 | do | 1 | do | 2-amino-4-methyl (CH₃, NH₂) | 1 | Do. |
| 15 | do | 1 | do | 4-amino-4'-sulpho-azobenzene (NH₂–C₆H₄–N=N–C₆H₄–SO₃H) | 1 | Yellow-brown. |
| 16 | H₃CO–C₆H₄–NH₂ | 1 | do | Same as above | 1 | Do. |
| 17 | HO₃S–naphthyl–NH₂ | 1 | do | 2-nitro-4-amino-phenol (OH, NO₂, NH₂) | 1 | Do. |
| 18 | H₂N–C₆H₄(SO₃H)–NH– | 1 | do | Diazotized naphthylamine sulphonic acid coupled component (HOOC, SO₃H, NH₂, N=N, NO₂) | 1 | Brown. |
| 19 | O₂N–C₆H₄–NH–C₆H₄–NH₂ | 1 | do | HOOC–C₆H₄–NH₂ | 1 | Yellow-brown. |

| Ex. No. | I, First diazo component | II, $n_1$ | III, Coupling component of Formula III | IV, Second diazo component | V, $n_2$ | Shade of dyeing on leather |
|---|---|---|---|---|---|---|
| 20 | Same as above | 1 | do | (benzene with NH₂ and N=N–benzene–NO₂, SO₃H) | 1 | Do. |
| 21 | HO₃S–benzene–N=N–benzene–NH₂ | 1 | do | (benzene with NH₂ and NH–benzene–NO₂, SO₃H) | 1 | Do. |
| 22 | Same as above | 1 | do | (benzene with NH₂ and NH–benzene–SO₃H, NO₂) | 1 | Do. |
| 23 | (benzene with SO₃H, NO₂, NH–NH₂ benzene) | 1 | do | (benzene with NH₂ and N=N–benzene–NO₂, SO₃H) | 1 | Do. |
| 24 | (benzene with CH₃, SO₃H, N=C–S– NH₂ benzene) | 1 | do | | | Do. |
| 25 | (naphthalene with NH₂, SO₃H, N=N–benzene with OH, NO₂, O₂N) | 1 | do | | | Brown. |
| 26 | (benzene with NH₂, Cl, O₂N) | 1 | do | (benzene with NH–benzene–NO₂, SO₃H, NH₂) | | Yellow-brown. |
| 27 | (naphthalene with NH₂, SO₃H) | 1 | do | Same as above | | Do. |
| 28 | (benzene with COOH, NH₂, HO₃S) | 1 | do | do | 1 | Do. |
| 29 | (naphthalene with NH₂) | 1 | do | do | 1 | Do. |

| Ex. No. | I, First diazo component | II, $n_1$ | III. Coupling component of Formula III | IV, Second diazo component | V, $n_2$ | Shade of dyeing on leather |
|---|---|---|---|---|---|---|
| 30 | [phenyl-CONH-phenyl-NH$_2$] | 1 | do | [H$_2$N-phenyl-N=N-phenyl-SO$_3$H] | 1 | Do. |
| 31 | [HOOC-phenyl(NO$_2$)-NH$_2$, COOH] | 1 | do | Same as above | | Do. |
| 32 | [phenyl(NH$_2$)-SO$_3$H] | 1 | do | [CH$_3$-phenyl-NH-phenyl(SO$_3$H)-NO$_2$, NH$_2$] | 1 | Do. |
| 33 | [phenyl(NH$_2$)-SO$_3$H] | 1 | do | [phenyl-NH-phenyl(COOH)-NO$_2$, NO$_2$, NH$_2$] | 1 | Do. |
| 34 | [HOOC-HO-phenyl-NH$_2$] | 1 | do | [phenyl(NH$_2$)-NO$_2$] | 1 | Do. |
| 35 | [HOOC-HO-phenyl(NH$_2$)-SO$_3$H] | 1 | do | [phenyl(NH$_2$)-OCH$_3$] | 1 | Do. |
| 36 | [naphthyl(NH$_2$)(SO$_3$H)-SO$_3$H] | 1 | do | | | Do. |
| 37 | [NO$_2$-phenyl-CH=CH-phenyl(SO$_3$H)-NH$_2$, SO$_3$H] | 1 | do | | | Do. |
| 38 | [phenyl(NH$_2$)-N=CH-HN-phenyl] | 1 | do | [H$_2$N-phenyl-SO$_3$H] | 1 | Do. |
| 39 | [O$_2$N-C-S-C-NH$_2$ / HC=N heterocycle] | 1 | do | | | Do. |

| Ex. No. | I, First diazo component | II, $n_1$ | III. Coupling component of Formula III | IV, Second diazo component | V, $n_2$ | Shade of dyeing on leather |
|---|---|---|---|---|---|---|
| 40 | [structure: O₂N–C₆H₃(CH₃)–NH–C₆H₄–N=N–naphthalene(NH₂)(SO₃H)] | 1 | ...do... | | | Red-brown. |
| 41 | [structure with NH₂] | 1 | ...do... | [structure: HN–C₆H₄–NO₂ with SO₃H; H₂N–naphthalene(OH)(SO₃H)] | 1 | Yellow-brown. |
| 42 | [structure: O₂N–C₆H₄–NH–C₆H₃(SO₃H)–N=N–naphthalene(NH₂)(SO₃H)] | 1 | ...do... | [structure: NH₂ OH naphthalene with N=N–C₆H₄–NO₂ and SO₃H groups] | 1 | Dark brown. |

EXAMPLE 43

One mole of the monoazo dye produced as in Example 1 is dissolved in water and this solution is combined at a pH-value of 10–13 with a solution of 1 mole of the diazotized monoazo dye formed by coupling 4-diazo-4'-nitro - 2'-sulphodiphenylamine with 1 mole of 1-amino-naphthalene-6-sulphonic acid. On completion of the coupling reaction the dye solution is adjusted of sodium chloride. On drying, it is obtained as a brown powder which dissolves readily in water and dyes leather in bright, level and fast havana shades.

The chromium complexes of the dyes of Examples 6 to 43 can be produced in analogy with the procedure of Example 2. They give dyeings on leather which are comparable in shade to those obtained with the corresponding metal-free dyes.

DYEING EXAMPLE 100 parts of freshly tanned, neutralized chrome grain leather are drummed in a drum dyeing machine in a liquor of 250 parts of water at 65° and 1 part of the dye produced as in Example 1 or 2. After 30 minutes 2 parts of an anionic fat liquor based on sulphonated train oil are added and drumming continued for 30 minutes. Subsequently the leather is dried and finished by the normal method. A level dyeing of yellow-brown shade is obtained.

Formulae of representative dyes of the foregoing examples are as follows:

EXAMPLE 1

EXAMPLE 2

The chromium complex compound of Example 1.

EXAMPLE 5

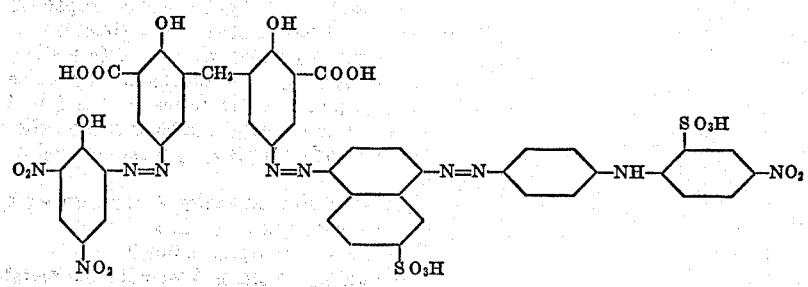

EXAMPLE 5a

The chromium complex compound of Example 5.

EXAMPLE 23

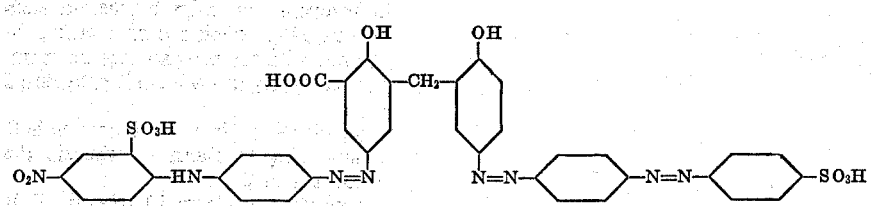

EXAMPLE 23a

The chromium complex compound of Example 23.

EXAMPLE 25

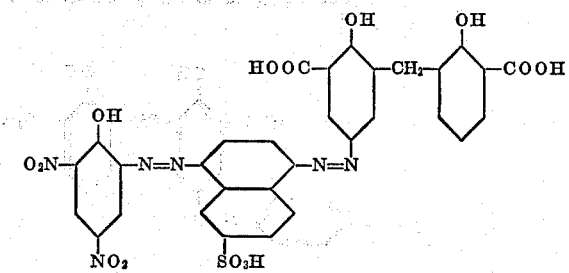

EXAMPLE 25a

The chromium complex compound of Example 25.

EXAMPLE 40

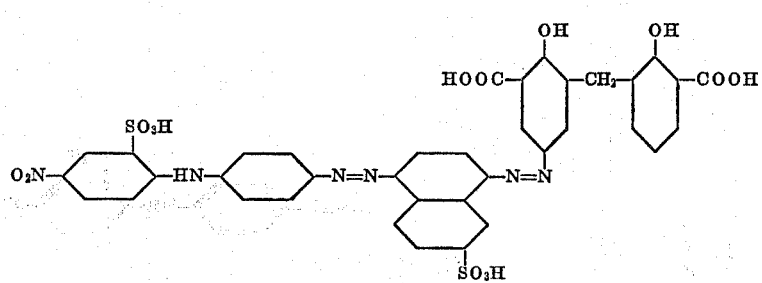

EXAMPLE 40a

The chromium complex compound of Example 40.

EXAMPLE 43

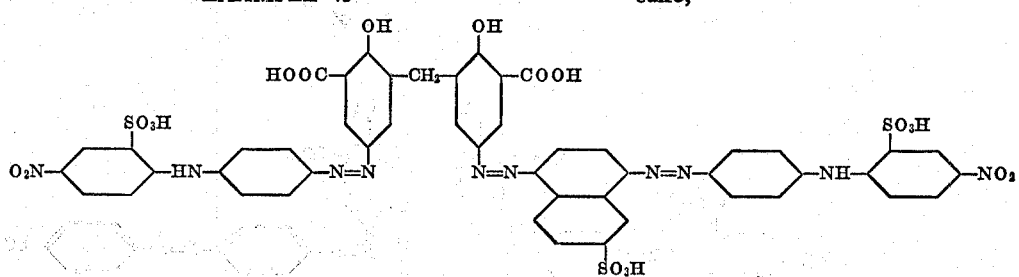

EXAMPLE 43a

The chromium complex compound of Example 43.

Having thus disclosed the invention what I claim is:

1. A compound of the formula

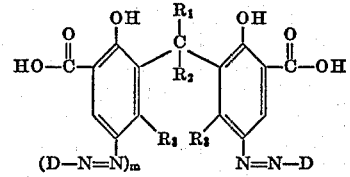

or a metal complex thereof, wherein
the metal is chromium, copper, nickel, cobalt, manganese or iron,
$R_1$ is hydrogen, alkyl or substituted alkyl,
$R_2$ is hydrogen, alkyl, substituted alkyl, phenyl, substituted phenyl, naphthyl or substituted naphthyl, each
$R_3$ is independently hydrogen, alkyl, substituted alkyl or sulfo, wherein, in each of $R_1$, $R_2$ and $R_3$, each substituent of substituted alkyl is independently halo, hydroxy, cyano or phenyl, and each substituent of substituted phenyl and substituted naphthyl is independently alkyl, alkoxy, halo, cyano, nitro, hydroxy, amino, alkylsulfonyl, alkylcarbonyl, alkylsulfonylamino, phenylsulfonylamino, naphthylsulfonylamino carboxy or sulfo, and in which each alkyl and alkyl chain of substituted alkyl, alkoxy, alkylsulfonyl, alkylcarbonyl and alkylsulfonylamino independently has 1–6 carbon atoms, $m$ is 0 or 1, and each D is independently phenyl, naphthyl, phenylazophenyl, anilinophenyl, phenylazonaphthyl, anilinophenylazonaphthyl or styrylphenyl, or a substituted derivative thereof, wherein each substituent is independently sulfo, halo, nitro, benzamido, carboxy, hydroxy, lower, alkyl, lower alkoxy or cyano.

2. A compound according to claim 1 having the formula

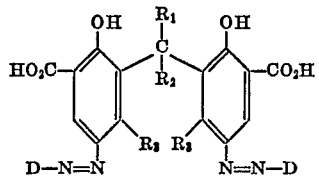

3. A compound according to claim 1 having the formula

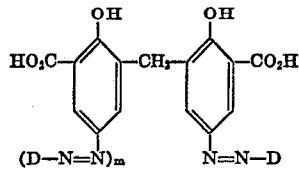

or a metal complex thereof, wherein $m$ is 0 or 1, and each

D is independently phenyl, naphthyl, phenylazophenyl, anilinophenyl, phenylazonaphthyl or anilino phenylazonaphthyl, or a substituted derivative thereof, or 3-sulfo-4-(2-sulfo-4-nitrostyryl)phenyl, wherein each substituted derivative has 1 to 4 substituents and each substituent is independently sulfo, chloro, nitro, benzamido, carboxy, hydroxy, methyl or methoxy.

4. A compound according to claim 3 wherein

D is phenyl, 1-naphthyl, 2-naphthyl, 4-phenylazophenyl, 3-anilinophenyl, 4 - anilinophenyl, 7 - phenylazo-1-naphthyl, 4-phenylazo-1-naphthyl or 4-(4-anilinophenylazo)-1-naphthyl, or a substituted derivative thereof, wherein each substituted derivative has 1 to 4 substituents and each substituent is independently sulfo, chloro, nitro, benzamido, carboxy, hydroxy, methyl or methoxy.

5. A compound according to claim 4 wherein each substituent is independently sulfo or nitro.

6. A metal complex according to claim 3.

7. A complex according to claim 6 wherein the metal is chromium.

8. A compound according to claim 3 wherein $m$ is 1.

9. A compound according to claim 8 wherein the number of sulfo groups is 1 to 4.

10. A compound according to claim 8 wherein each D is independently 4-(nitroanilino)phenyl or a sulfo substituted derivative thereof with the proviso that the number of sulfo groups on each ring of each sulfo substituted derivative is 0 or 1.

11. A compound according to claim 3 wherein $m$ is 0.

12. A compound according to claim 11 wherein the number of sulfo groups is 1 or 2.

13. A compound according to claim 11 wherein D is 4-(nitroanilino)phenyl or a sulfo substituted derivative thereof with the proviso that the number of sulfo groups on each ring of the sulfo substituted derivative is 0 or 1.

14. The complex according to claim 7 which is the chromium complex of

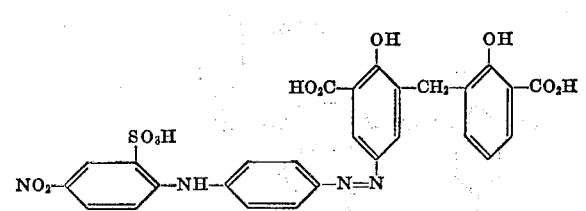

15. The complex according to claim 7 which is the chromium complex of

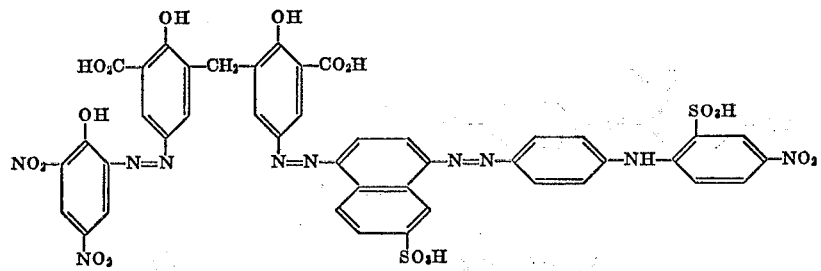

16. The complex according to claim 7 which is the chromium complex of

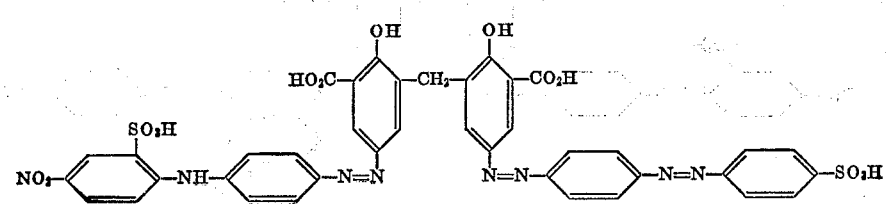

17. The complex according to claim 7 which is the chromium complex of

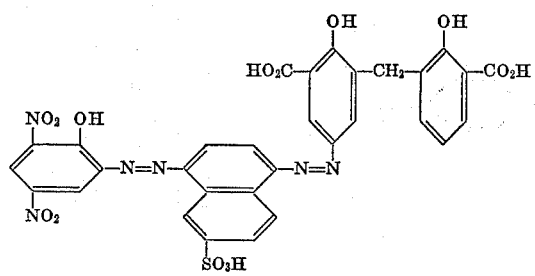

18. The complex according to claim 7 which is the chromium complex of

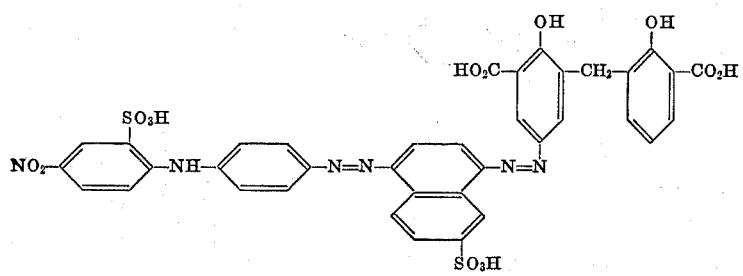

19. The complex according to claim 7 which is the chromium complex of

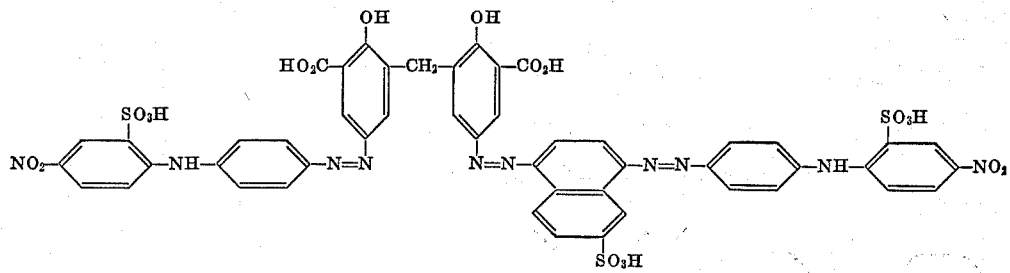

20. A compound according to claim 13 of the formula

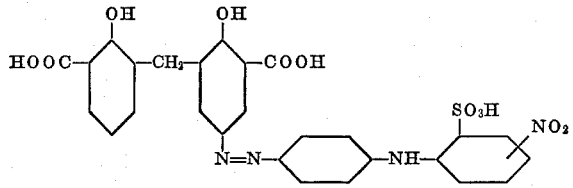

21. A compound according to claim 11 of the formula

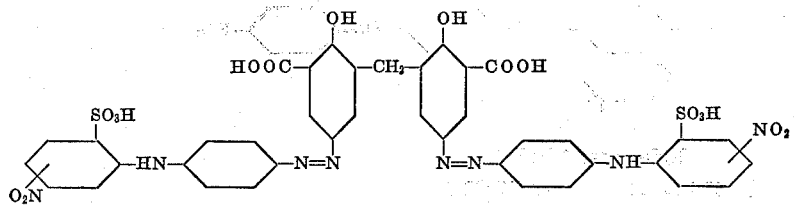

22. A compound according to claim 9 of the formula

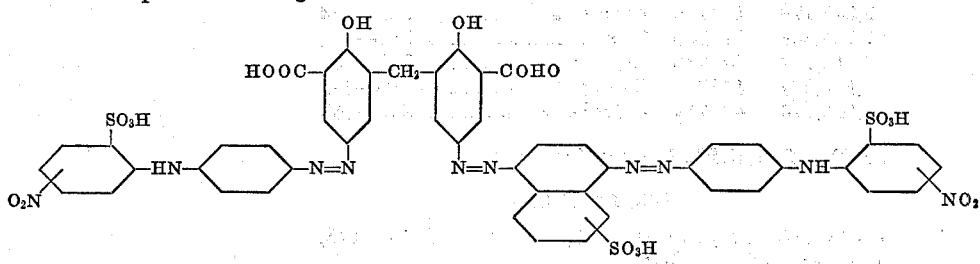

23. The compound according to claim 20 of the formula

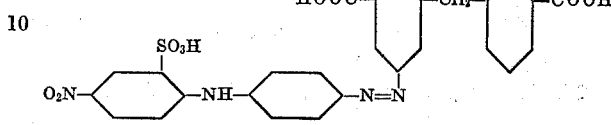

24. The compound according to claim 9 of the formula

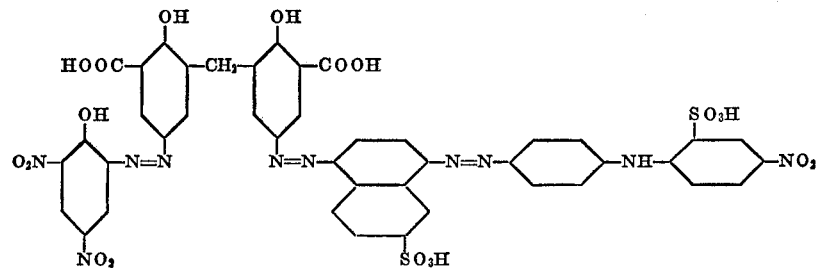

25. The compound according to claim 9 of the formula

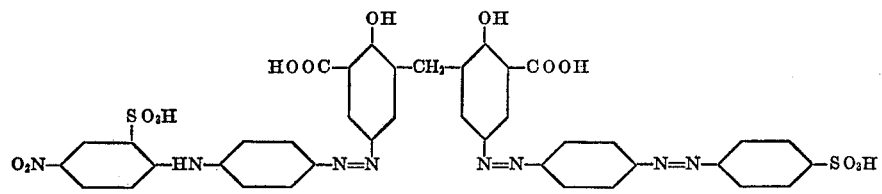

26. The compound according to claim 12 of the formula

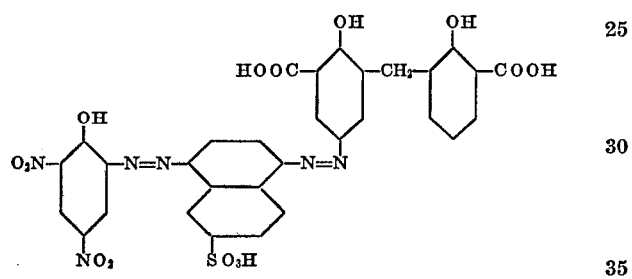

27. The compound according to claim 12 of the formula

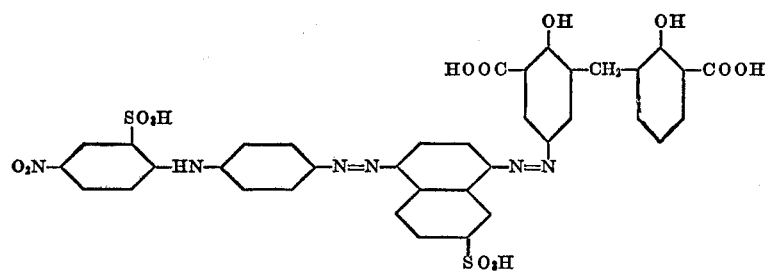

28. The compound according to claim 9 of the formula

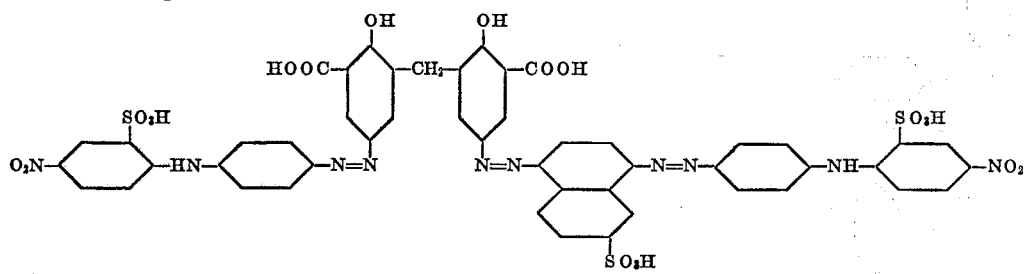

References Cited
UNITED STATES PATENTS

| | | | |
|---|---|---|---|
| 1,910,690 | 5/1933 | Gubelmann et al. | 260—162 |
| 2,043,199 | 6/1936 | Koch et al. | 260—184 |
| 2,945,848 | 7/1960 | Cole | 260—172 |
| 1,766,947 | 6/1930 | Saunders | 260—162 |
| 1,810,277 | 6/1931 | Kalischer et al. | 260—199 |
| 1,905,294 | 4/1933 | Kalischer et al. | 260—162 |

FLOYD D. HIGEL, Primary Examiner

U.S. Cl. X.R.

8—13; 260—148, 149, 151, 152, 158, 159, 162, 163, 173, 179, 184, 185, 187, 207